UNITED STATES PATENT OFFICE.

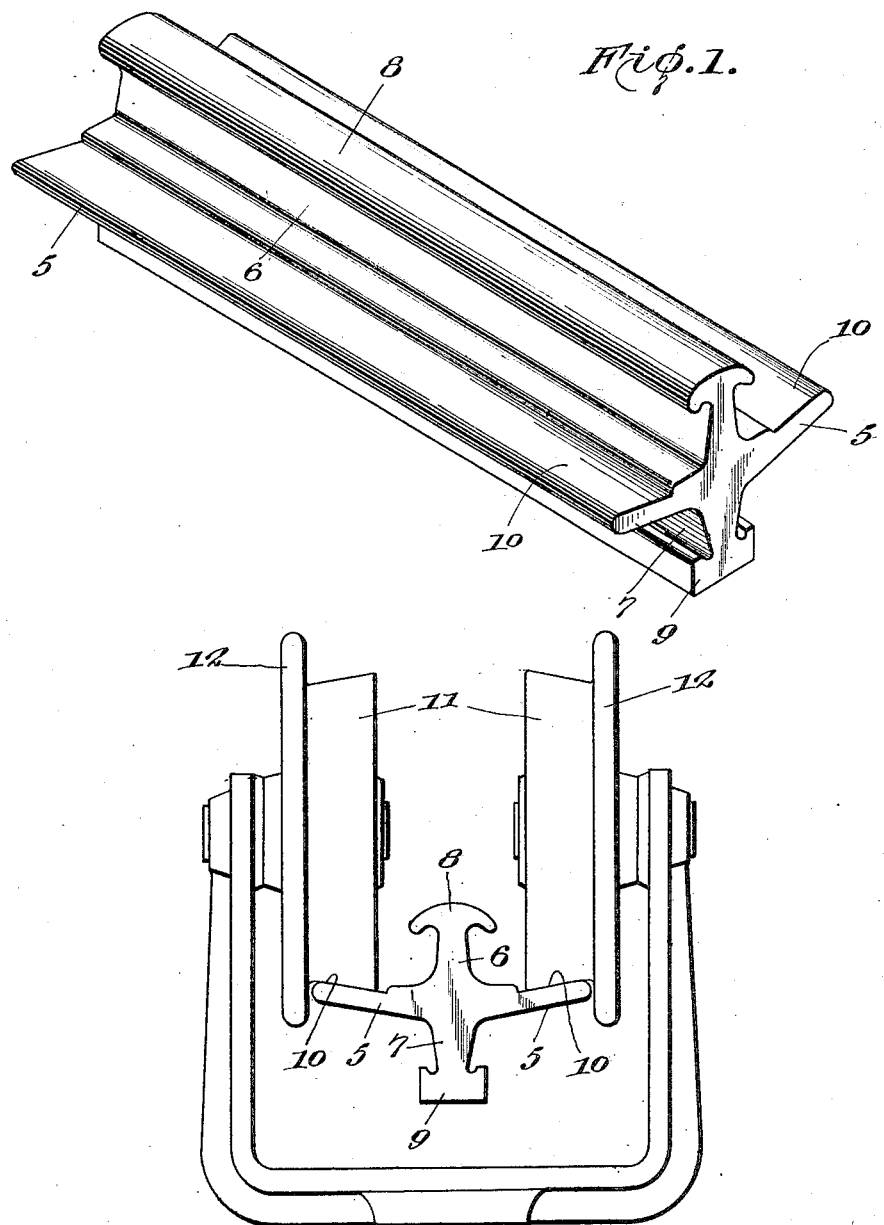

FREDERIC P. TISLER, OF CHICAGO, ILLINOIS.

HAY-CARRIER TRACK.

1,410,780.　　　　Specification of Letters Patent.　　Patented Mar. 28, 1922.

Application filed January 16, 1922. Serial No. 529,629.

*To all whom it may concern:*

Be it known that I, FREDERIC P. TISLER, a citizen of the United States, residing at Chicago, in the county of Cook and State of Illinois, have invented new and useful Improvements in Hay-Carrier Tracks, of which the following is a specification.

This invention relates to hay and other load carriers which run on an overhead track, and its object is to provide a novel and improved track and wheel construction which effectually prevents any tendency of the wheels to spread and cause looseness and ultimate collapse of the carrier frame supported by the wheels.

The object stated is attained by the construction to be described in detail hereinafter, and in order that the same may be better understood, reference is had to the accompanying drawing, wherein—

Figure 1 is a perspective view of the track, and

Fig. 2 is an end view of the track and a fragment of the carrier mounted thereon.

Referring specifically to the drawing, the track member or rail is made substantially cruciform in cross-section to obtain outstanding tread flanges 5 on opposite sides of a median web having an upstanding upper portion 6 projecting above the flanges, and a depending lower portion 7 projecting below said flanges. The top of the web portion 6 is formed with a head 8, and the bottom of the web portion 7 has a head 9. These heads are provided for the attachment of the brackets whereby the track is suspended from an overhead support, and it will be noted that they differ in shape, which is for the purpose of assuring that the track be properly mounted to position the tread surfaces of the flanges 5 on top. The bracket members carrying the track will be made to correspond to the shape of the heads, and hence it will be impossible to mount the track wrong or in inverted position.

The top or tread surface 10 of each flange 5 is made flat, and with an inward and downward slope, and the wheels of the carrier are made to conform to this surface. The wheels are arranged in pairs, one wheel being mounted on one flange 5 and the other wheel being oppositely disposed and mounted on the other flange 5. Each wheel is composed of a tread portion 11 and a flange 12 at one end thereof, said flange being located alongside the edge of the flange 5. The tread portion 11 of the wheel has the shape of a frusto-conical roller, the flange 12 being at the smaller end. This shape of the tread portion 11 of the wheels adapts the same to the inwardly inclined tread surface 10 of the flanges 5, and counteracts any spreading tendency of the wheels, the inclined surfaces constantly urging the wheels inwardly toward each other rather than outwardly or away from each other. The structure therefore effectually prevents the carrier frame from getting loose which is very often the case where the track is so constructed that it does not counteract the spreading tendency of the wheels.

I claim—

1. A track member comprising a medial vertical web and flanges projecting horizontally from opposite sides thereof, the top of each flange having a flat tread surface which slopes downwardly in the direction of the web, said web projecting above and below the flanges, and its extremities being provided with heads, the head of one web projection being shaped differently from the head of the other web projection.

2. The combination of oppositely located wheels, and a track for supporting said wheels, said track having a supporting flange for each wheel, the tread surface of said flange being flat and having a downward and inward slope, and each wheel having a tread portion which is frusto-conical to seat on and conform to the aforesaid sloping tread surface of the flange.

3. The combination of oppositely located wheels, and a track for supporting said wheels, said track having a supporting flange for each wheel, the tread surface of said flange being flat and having a downward and inward slope, and each wheel having a tread portion which is frusto-conical to seat on and conform to the aforesaid sloping tread surface of the flange, and a flange at the smaller end of the wheel tread portion, said wheel flange being located alongside the edge of the tread flange of the track.

In testimony whereof I affix my signature.

FREDERIC P. TISLER.